(12) United States Patent
Nakamura et al.

(10) Patent No.: US 12,213,063 B2
(45) Date of Patent: Jan. 28, 2025

(54) SLICE GATEWAY, QUALITY CALCULATION APPARATUS, INSPECTION PACKET PROCESSING METHOD AND PROGRAM

(71) Applicant: NIPPON TELEGRAPH AND TELEPHONE CORPORATION, Tokyo (JP)

(72) Inventors: Takayuki Nakamura, Musashino (JP); Tomohiro Okada, Musashino (JP); Shunsuke Homma, Musashino (JP); Takuya Sato, Musashino (JP); Hidetaka Nishihara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 360 days.

(21) Appl. No.: 17/630,993

(22) PCT Filed: Jul. 30, 2019

(86) PCT No.: PCT/JP2019/029851
§ 371 (c)(1),
(2) Date: Jan. 28, 2022

(87) PCT Pub. No.: WO2021/019690
PCT Pub. Date: Feb. 4, 2021

(65) Prior Publication Data
US 2022/0264441 A1    Aug. 18, 2022

(51) Int. Cl.
H04W 48/18    (2009.01)
H04W 4/70    (2018.01)
(Continued)

(52) U.S. Cl.
CPC ............. *H04W 48/18* (2013.01); *H04W 4/70* (2018.02); *H04W 28/0268* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 7,796,617 B1 * | 9/2010 | Bostrom | H04L 12/4633 370/465 |
| 2016/0197832 A1 * | 7/2016 | Barry | H04L 43/06 370/329 |

(Continued)

OTHER PUBLICATIONS

Takuya Sato et al., "Network slicing technology that quickly responds to a wide range of requirements", NTT Technology Journal, vol. 31, No. 4, 2019.

(Continued)

*Primary Examiner* — Adnan Baig
(74) *Attorney, Agent, or Firm* — IPUSA, PLLC (57) ABSTRACT

A slice gateway connects one or more subslices in a network in which an E2E slice is made up of multiple subslices. The slice gateway receives an inspection packet, determines an output destination subslice of the inspection packet based on a distribution table, embeds an ID of the output destination subslice in a payload of the inspection packet, and outputs the packet that includes the embedded ID to the output destination subslice; and notifies a quality tabulation device of information regarding the inspection packet.

7 Claims, 11 Drawing Sheets

(51) Int. Cl.
*H04W 28/02* (2009.01)
*H04W 48/16* (2009.01)

(56) References Cited

U.S. PATENT DOCUMENTS

| | | | | |
|---|---|---|---|---|
| 2020/0366607 A1* | 11/2020 | Kommula | ............... | H04L 45/20 |
| 2020/0366612 A1* | 11/2020 | Kommula | ............. | H04L 47/122 |
| 2020/0389527 A1* | 12/2020 | Fromentoux | ......... | H04W 76/11 |
| 2021/0289405 A1* | 9/2021 | Tamura | ................. | H04W 36/13 |
| 2022/0174514 A1* | 6/2022 | Kahn | .................... | H04W 48/18 |

OTHER PUBLICATIONS

Shinya Arita et al., "A Study on Telemetry for Network Slicing", IEICE Technical Report, vol. 118, No. 6, 2018.
P. Quinn et al., "Network Service Header (NSH)", Web literature, Jan. 2018.

* cited by examiner

| TRANSMISSION SOURCE | | TRANSMISSION DESTINATION | | PROTOCOL NUMBER | OUTPUT DESTINATION |
|---|---|---|---|---|---|
| IP ADDRESS | PORT NUMBER | IP ADDRESS | PORT NUMBER | | |
| A.A.A.A | a | B.B.B.B | b | c | SUBSLICE #1-1 |
| D.D.D.D | d | * | * | * | SUBSLICE #1-1 |
| * | * | E.E.E.E | e | * | SUBSLICE #1-2 |
| * | * | * | f | * | SUBSLICE #1-2 |

"*" MEANS ANY (WILDCARD)

Fig. 7

| SOURCE IP ADDRESS | DESTINATION IP ADDRESS | OUTPUT DESTINATION |
|---|---|---|
| A.A.A.A | B.B.B.B | SUBSLICE #1-1 |
| D.D.D.D | G.G.G.G | SUBSLICE #1-1 |
| D.D.D.D | I.I.I.I | SUBSLICE #1-1 |
| J.J.J.J | E.E.E.E | SUBSLICE #1-2 |
| K.K.K.K | L.L.L.L | SUBSLICE #1-2 |

| PAYLOAD | PROTOCOL NUMBER | SOURCE PORT | SOURCE ADDRESS | DESTINATION PORT | DESTINATION ADDRESS |

(b)

| PAYLOAD | DEDICATED HEADER | PROTOCOL NUMBER | SOURCE PORT | SOURCE ADDRESS | DESTINATION PORT | DESTINATION ADDRESS |

SLICE GATEWAY, QUALITY CALCULATION APPARATUS, INSPECTION PACKET PROCESSING METHOD AND PROGRAM

TECHNICAL FIELD

The present invention relates to a technique for quality measurement in a network that applies network slicing technology.

BACKGROUND ART

In the 5G era, there is expectation for the creation of new services by collaboration with various businesses by utilizing 5G features such as large-capacity broadband, mass session connection, and ultra-low latency high quality. In order to realize such new services, various types of networks that meet various service requirements are required.

Network slicing is technology for providing a network quickly and flexibly in response to such demands. In network slicing technology, the infrastructure of shared physical equipment is managed as virtually divisible resources, and such resources are freely combined to build a required virtual network (slice).

An E2E slice that can ensure a certain level of end-to-end (E2E) communication quality is required in order to provide a network that meets the various requirements of a service provider. The E2E slice is not necessarily a closed network within a single network operator/domain, and may be a network that spans multiple network operators/domains. An architecture has been proposed in which a slice gateway (SLG) is deployed at a connection point between operators/domains in order to realize such an E2E slice that spans a plurality of operators/domains (NPL 1).

E2E slices do not correspond one-to-one with slices (subslices) in the operators or domains, and it is envisioned that multiple provided E2E slices are mapped to one subslice. Also, it is envisioned that multiple E2E slices are used between one pair of a terminal and a server depending on the application.

In order to ensure a certain level of E2E communication quality, it is important to perform E2E communication quality measurement. This is thought to make it possible to meet quality requirements such as feedback to the control of transfer priority and routing in the network. As a conventional technique for perform slice quality measurement, NPL 2 proposes a technique of measuring the delay of each subslice between SLGs and performing integrated control with a controller.

CITATION LIST

Non Patent Literature

[NPL 1] Sato et al., "Service-partner-oriented Network Slicing," NTT Technical Review, June 2019 Vol. 17 No. 6.
[NPL 2] Arita et al., "A Study on Telemetry for Network Slicing," IEICE, Vol. 118, No. 6, NS2018-3, pp. 13-17, April 2018.
[NPL 3] IETF RFC8300, "Network Service Header (NSH)" https://datatracker.ietf.org/doc/rfc8300/

SUMMARY OF THE INVENTION

Technical Problem

As mentioned above, it is important to ensure E2E communication quality in order for a service provider who uses E2E slices to provide service in a stable manner, and therefore E2E communication quality needs to be measured. On the other hand, performing E2E communication quality measurement with conventional technology requires the implementation of a measurement function in the application that is the end point of communication, and if there is an increase in the number of application implementation hurdles, and different applications use the same E2E slice, then there is a possibility that the problem of wasting communication resources may occur.

The present invention has been made in view of the above points, and an object of the present invention is to provide a technique capable of measuring E2E communication quality in a network that uses an E2E slice, without implementing a measurement function in an application that is the end point of communication.

Means for Solving the Problem

One aspect of the disclosed technology provides a slice gateway that connects one or more subslices in a network in which an E2E slice is made up of a plurality of subslices, the slice gateway including:
  a slice processing unit configured to receive an inspection packet, determine an output destination subslice of the inspection packet based on a distribution table, embed an ID of the output destination subslice in a payload of the inspection packet, and output the packet that includes the embedded ID to the output destination subslice; and
  a notification unit configured to notify a quality tabulation device of information regarding the inspection packet.

Effects of the Invention

According to the disclosed technology, it is possible to provide a technique capable of measuring E2E communication quality in a network that uses an E2E slice, without implementing a measurement function in an application that is the end point of communication.

DESCRIPTION OF EMBODIMENTS

Hereinafter, an embodiment (the present embodiment) of the present invention will be described with reference to the drawings. The embodiment described below is merely an example, and the embodiments to which the present invention are applied are not limited to the following embodiment.

(Network Configuration, Operation Overview)

Figure 1:
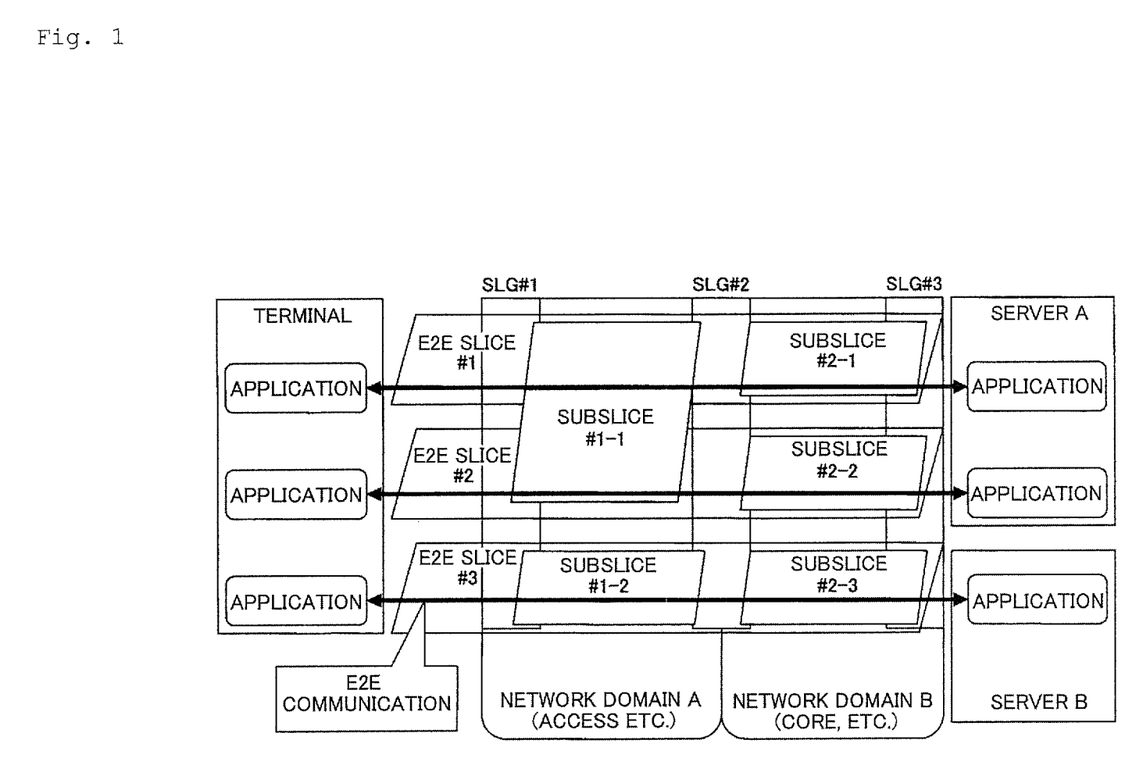
FIG. 1 is a diagram showing a presupposed network configuration.

FIG. 1 shows an example of the network configuration presupposed in the present embodiment. In the example shown in FIG. 1, one terminal uses a plurality of E2E slices (specifically, E2E slices #1 to #3) depending on the application or the like. The network also includes SLGs #1 to #3 that distribute packets to subslices.

As shown in FIG. 1, a subslice #1-1 and a subslice #1-2 are configured in a network domain A (access, etc.), and a subslice #2-1, a subslice #1-2, a subslice #2-2, and a subslice #2-3 are configured in a network domain B (core, etc.). Also, the terminal is provided with a plurality of applications, and each application communicates with a corresponding application provided in a server A or B via an E2E slice (virtual network).

Figure 2:
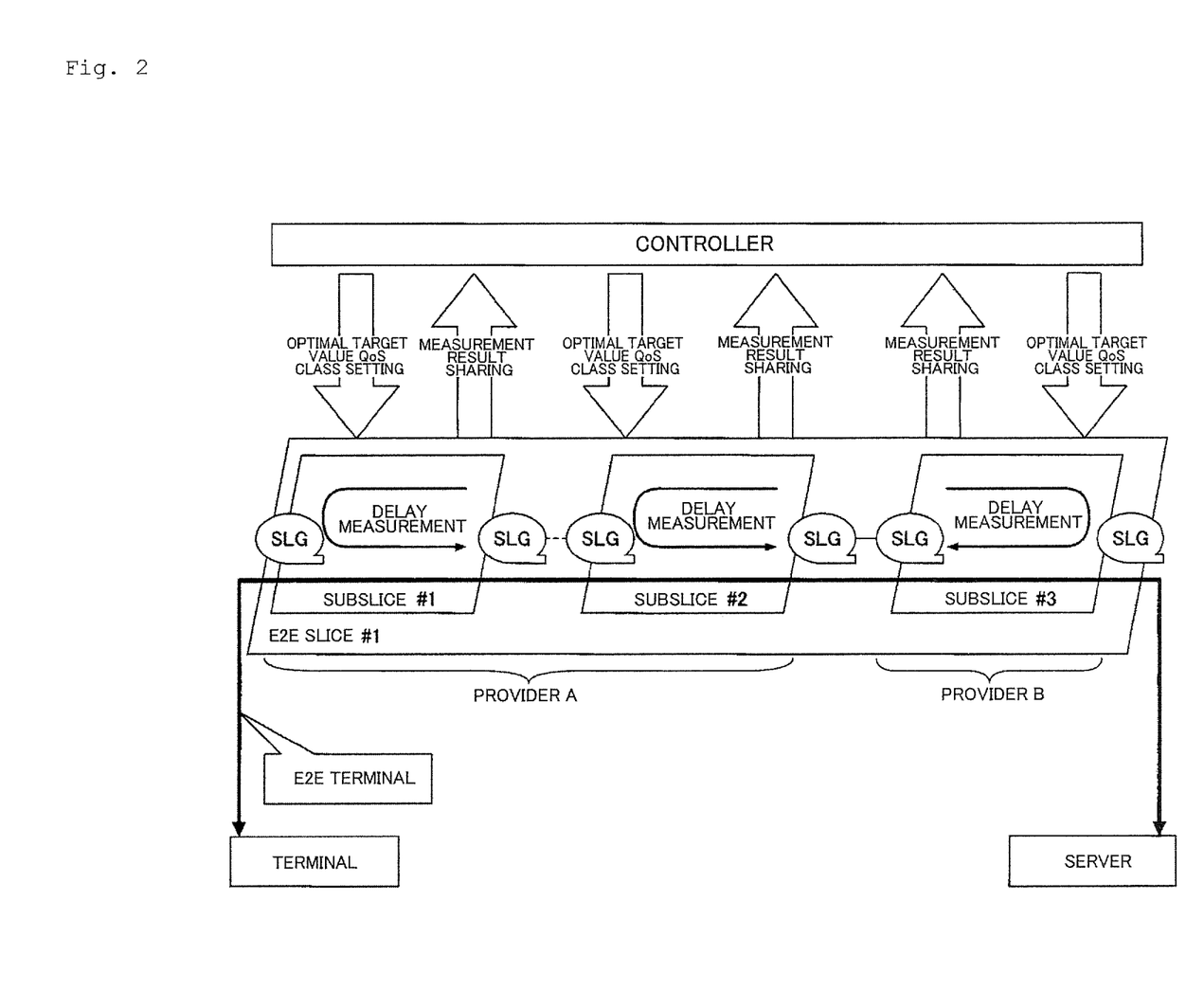
FIG. 2 is a diagram for describing E2E communication quality measurement.

FIG. 2 shows an example of a conventional technique for measuring the quality of an E2E slice (NPL 2). In this example, the delay of each subslice between SLGs is measured and controlled in an integrated manner by a controller.

Figure 3:
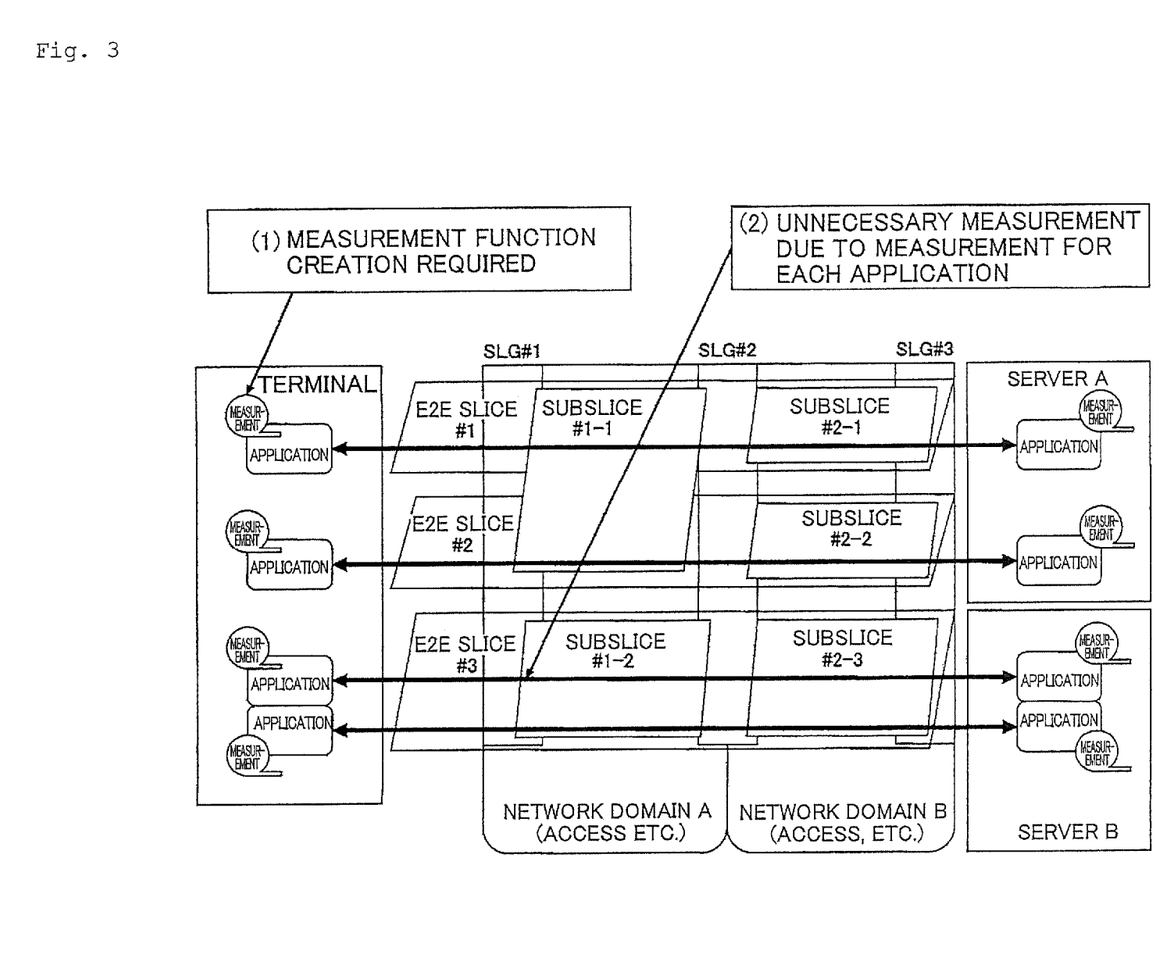
FIG. 3 is a diagram for describing a problem.

As mentioned above, performing E2E communication quality measurement with conventional technology requires the implementation of a measurement function in the application that is the end point of communication, and if there is an increase in the number of application implementation hurdles, and different applications use the same E2E slice, then there is a possibility that the problem of wasting communication resources may occur. FIG. 3 illustrates a case where such issues occur.

Figure 4:
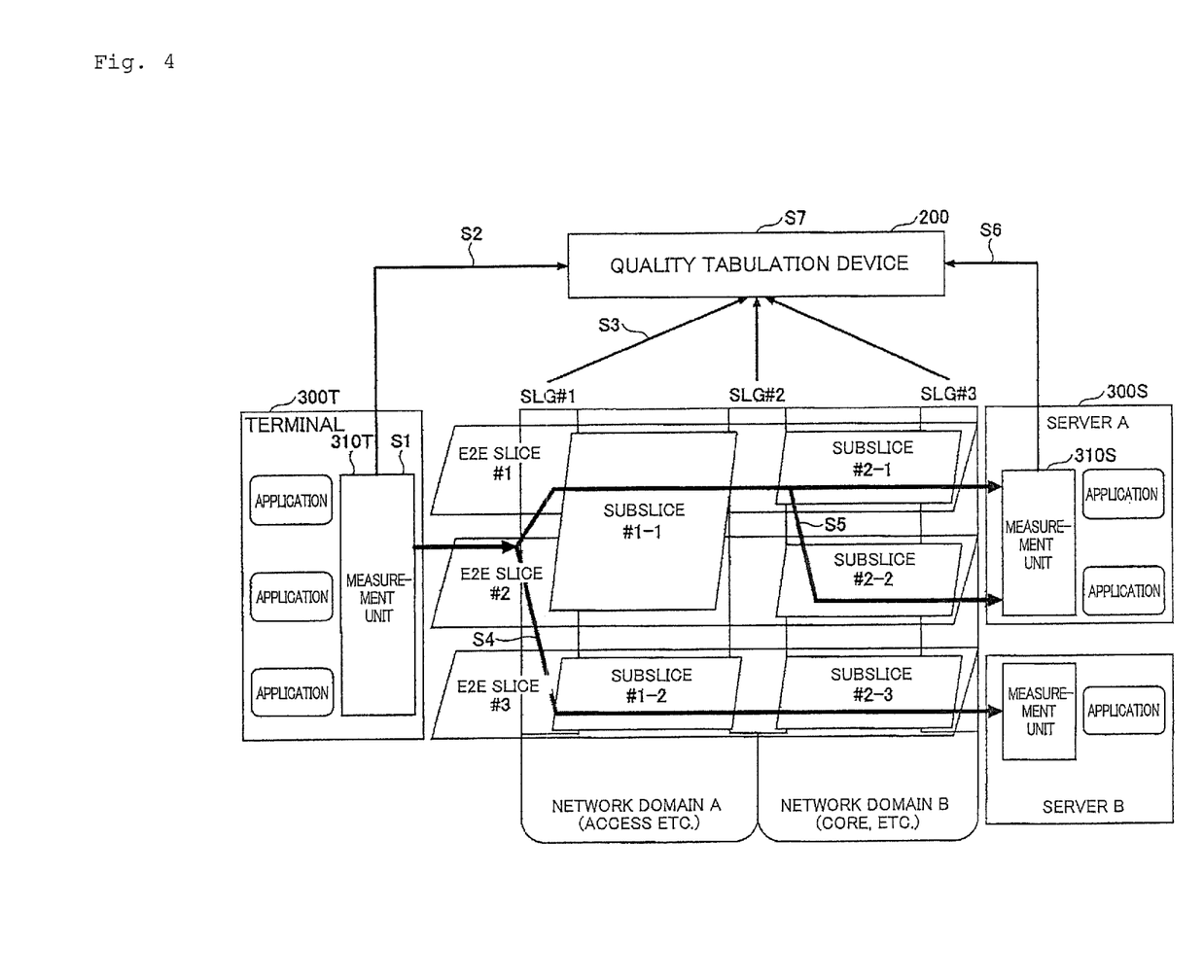
FIG. 4 is a diagram for describing a network configuration and operations according to an embodiment of the present invention.

FIG. 4 shows an example of a network configuration according to the present embodiment that solves the above-described problems. A quality measurement technique in the present embodiment is a quality measurement technique that uses the slice distribution function of an SLG. Specifically, in the present embodiment, a measurement function common to E2E slices (the measurement unit in FIG. 4) is implemented in a layer (OS/middleware layer) lower than the application layer in both a terminal 300T and a server 300S, and an SLG distribution table is used for quality measurement for each slice. Also, a quality tabulation device 200 for calculating quality based on notification information from the terminal/server and the SLG is provided.

Note that in the following description, 300 is used as the reference sign for the terminal/server, but 300T and 300S are respectively used when distinguishing between the terminal and the server. This similarly applies to the functional units in the terminal/server.

The following describes an overview of operations with reference to FIG. 4. In step S1, a measurement unit 310T of the terminal 300T transmits a packet (called an inspection packet) that includes an inspection packet identifier (the destination is a broadcast address or the like). In step S2, the measurement unit 310T notifies the quality tabulation device 200 of the transmission time and the like of the inspection packet. Then, in step S3, the SLG #1 that received the inspection packet transmits the reception time and the like to the quality tabulation device 200.

In step S4, after the arrival of the inspection packet, the SLG #1 copies and sends the inspection packet for each subslice to which the terminal 300T belongs according to the distribution table or the like of the SLG #1. In this example, the inspection packets are sent to the subslice #1-1 and the subslice #1-2.

In step S5, in the case of one-to-many distribution, the SLG #2 in the relay section also similarly copies and sends the inspection packet based on the distribution table. In step S6, a measurement unit 310S of the server A/B transmits the reception time and the like of the inspection packet to the quality tabulation device 200. In step S7, the quality tabulation device 200 calculates the quality of each E2E slice and each subslice based on the notifications.

Also, the following functions are deployed in each SLG in order to prevent an increase in the resource consumption of the devices caused by quality measurement at excessively short time intervals.

Specifically, in each SLG, a processing unit measures the time (hereinafter referred to as an aging timer) from when an inspection packet is transferred via an E2E slice until when an inspection packet arrives again via the same E2E slice, and if an inspection packet arrives again via the same E2E slice before the aging timer reaches a pre-set time, the inspection packet that arrived again is discarded. The quality of each subslice after the discarding of a packet is complemented using the measurement result of the previously transferred inspection packet.

For example, letting the preset time be TH, if the SLG #2 in FIG. 4 transfers a inspection packet received from the subslice #1-1 (the inspection packet in the E2E slice #1), and then receives an inspection packet from the subslice #1-1 when a time T (<TH) has elapsed, that inspection packet is discarded.

System Configuration and Example of Operations of Units

Figure 5:
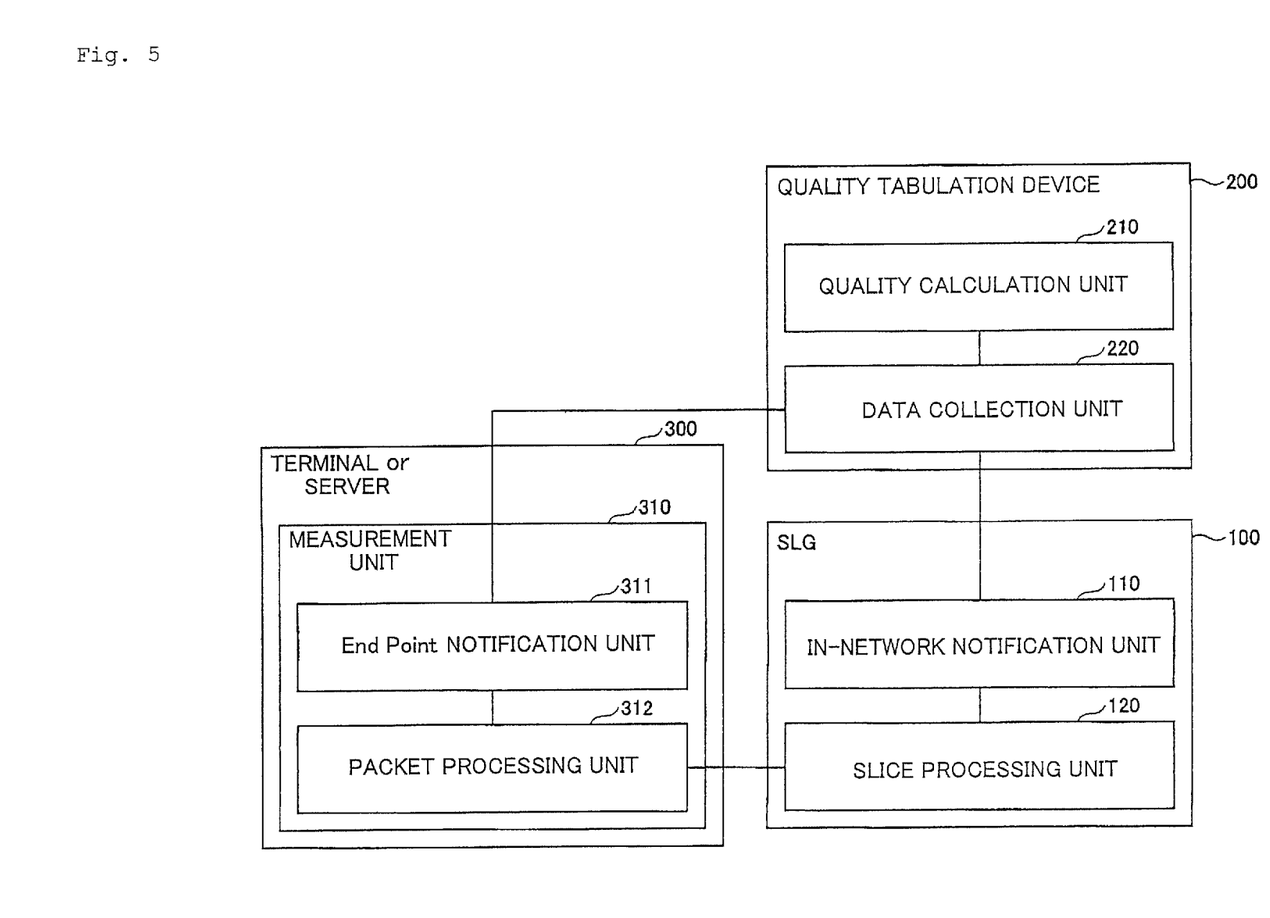
FIG. 5 is a diagram showing functional blocks of a system.

FIG. 5 shows a configuration example of a system that includes an SLG 100, the quality tabulation device 200, and the "terminal or server" 300. The devices shown in FIG. 5 are connected to a network and can exchange data with each other. Here, "terminal or server" means that both the terminal and the server have the configuration shown in FIG. 5.

As shown in FIG. 5, the SLG 100 has an in-network notification unit 110 and a slice processing unit 120. The quality tabulation device 200 has a quality calculation unit 210 and a data collection unit 220. The "terminal or server" 300 has a measurement unit 310, and the measurement unit 310 has an end point notification unit 311 and a packet processing unit 312. The operations of the units of these devices will be described below.

<SLG 100>

Upon receiving an inspection packet, the in-network notification unit 110 notifies the data collection unit 220 of the reception time, transmission source information, input source/output destination subslice IDs, and SLG ID.

Figure 6:
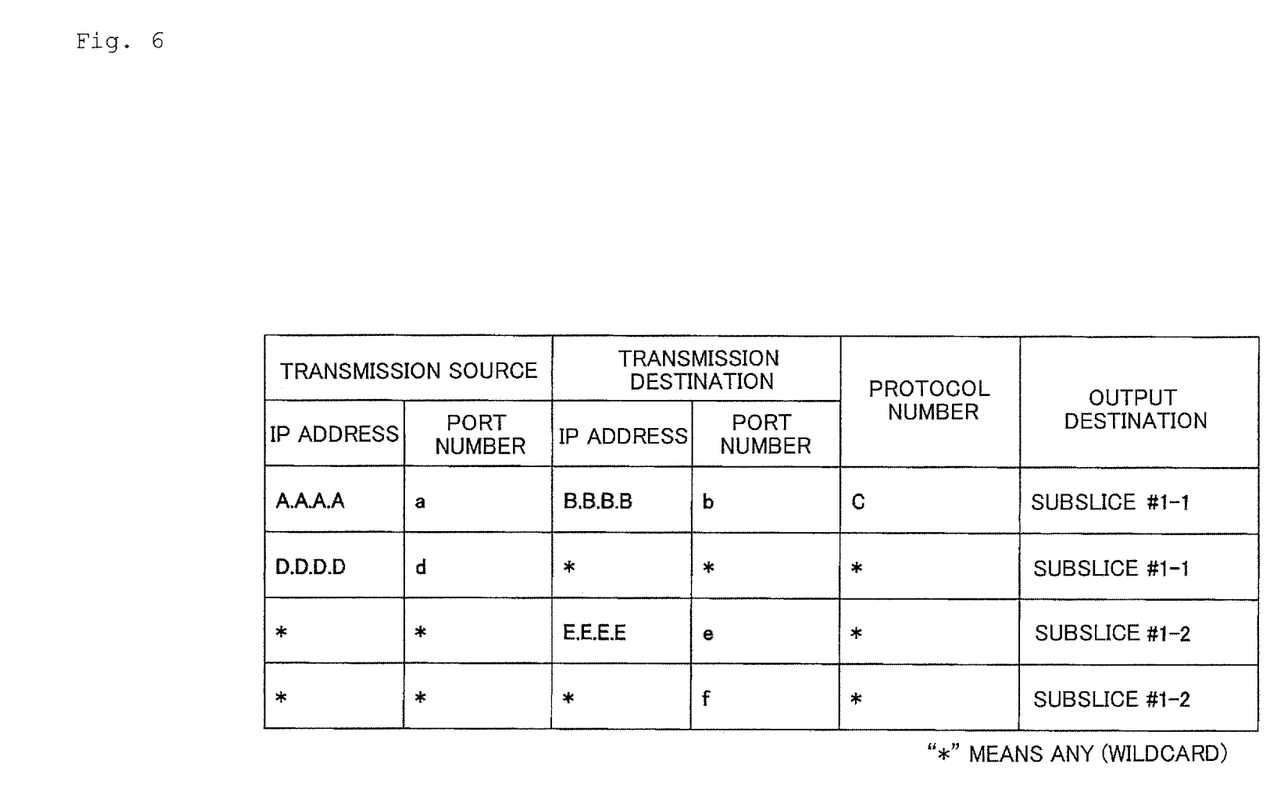
FIG. 6 is a diagram showing a specific example of a distribution table.

The slice processing unit 120 performs normal packet processing (slice termination, quality control, etc.) necessary for network slice provision. A table (distribution table) for distributing packets to subslices is stored in a storage device such as a memory in this function unit. FIG. 6 shows an example of a distribution table when performing distribution on a 5-tuple basis. Note that the function of performing normal packet processing required for network slice provision and the table used to distribute packets to subslices are functions generally provided for an SLG. The processing described below is processing that is based on the technique of the present invention.

Upon receiving an inspection packet, the slice processing unit 120 detects the inspection packet and performs the following processing of steps S11 to S14.

Step S11: reference the distribution table and extract the packet output destination subslice from the source IP address and the like. At this time, if there are multiple output destination subslices, the inspection packet is copied a corresponding number of times. Note that there are cases where it is difficult to determine an output destination subslice based on only the source IP address of the inspection packet and the distribution table, and therefore combinations of a source IP address and a distribution destination subslice are recorded in advance as another table separate from the above distribution table when the slice processing unit 120 performs packet processing for E2E communication, and that table is used in the aforementioned cases to extract an output destination subslice from the source IP address when an inspection packet arrives. Note that the other table is an example of a distribution table.

Figure 7:
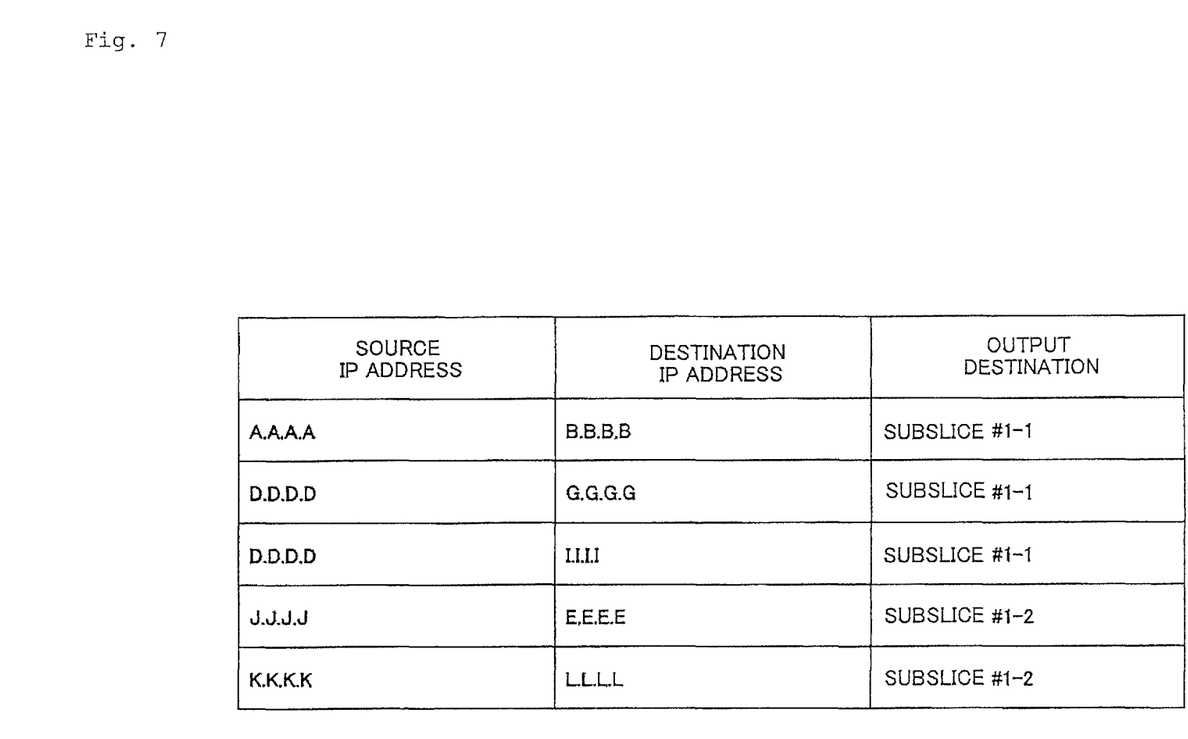
FIG. 7 is a diagram showing a specific example of a distribution table.

An example of the aforementioned other table is shown in FIG. 7. This table is recorded in advance based on actual terminal-server communication, and is used for conversion between the output destination of an inspection packet and a destination IP address.

Step S12: the ID of the output destination subslice is embedded in the packet payload. However, if the SLG 100 is at the end point of the E2E slice, this processing is skipped.

Step S13: if the SLG 100 is at the end point of the E2E slice, the destination of the inspection packet is converted to the IP address of the end point (terminal or server) of the E2E slice. In this case as well, another table can be used. As a specific example, in the case of an inspection packet from the terminal 300T in FIG. 4, in the SLG #3, the destination of the inspection packet is converted to the IP addresses of the server A or the server B.

Step S14: after the above, the inspection packet is output to the subslice or the end point (terminal or server) of the E2E slice. Also, the slice processing unit 120 holds an aging timer for each E2E slice. When an inspection packet arrives, if the value of the aging timer of the E2E slice to which the inspection packet belongs is less than the preset value, that inspection packet is discarded.

<Quality Tabulation Device 200>

The quality calculation unit 210 calculates E2E quality information and quality information for each subslice based on information accumulated in the data collection unit 220.

The data collection unit 220 stores the information notified by the "terminal or server" 300 and the SLG 100 together with notification source information.

<"Terminal or Server" 300>

The end point notification unit 311 in the measurement unit 310 notifies the data collection unit 220 of the transmission time, transmission source information, packet size, and transmission flag when an inspection packet is transmitted. Also, when an inspection packet is received, the data collection unit 220 is notified of the reception time, transmission source information, reception flag, and transit subslice ID described in the payload.

The packet processing unit 312 transmits or receives inspection packets. Note that if it is difficult to implement the measurement unit 310 in a terminal or a server, the measurement unit 310 may be implemented in the SLG 100 at the slice end point.

(Inspection Packet)

An inspection packet has information added to the packet header as follows so that the SLG 100 can detect the packet.

Combination of TCP/IP header information such as source/destination port numbers Insertion of dedicated header field such as NSH (NPL 3)

Addition of information to a header that does not correspond to the above but can be detected by an SLG Transmission source information (an ID that is generated from the MAC address or the like and can identify the terminal/server) is described in the payload portion of the inspection packet.

Figure 8:
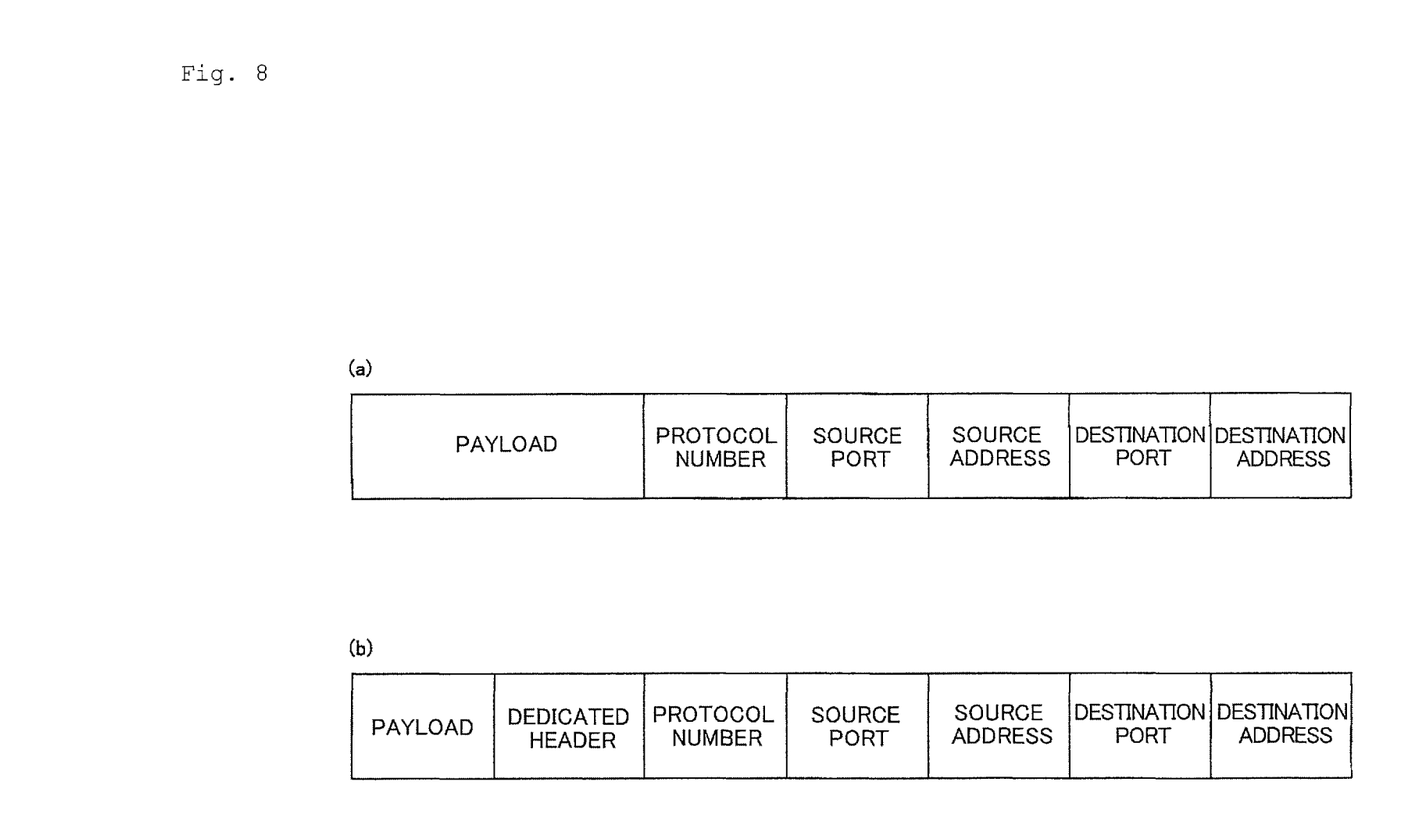
FIG. 8 is a diagram showing a specific example of an inspection packet.

In FIG. 8, (a) shows a specific example of an inspection packet having a combination of TCP/IP header information such as source/destination port numbers as a header. Specific source/destination port numbers are assigned for use with inspection packets, and the SLG 100 detects a packet having those port numbers.

In FIG. 8, (b) shows a specific example of an inspection packet in which a dedicated header field such as NSH has been inserted. The SLG 100 can detect an inspection packet according to the dedicated header.

Hardware Configuration Example

The SLG 100, the terminal 300T, the server 300S, and the quality tabulation device 200 can each be realized by causing a computer to execute a program, for example.

Specifically, each device can be realized by executing a program corresponding to the processing executed by the device with use of hardware resources such as a CPU and a memory built in a computer. The program can be recorded, stored, and distributed on a computer-readable recording medium (e.g., a portable memory). It is also possible to provide the program through a network such as the Internet or e-mail.

Figure 9:
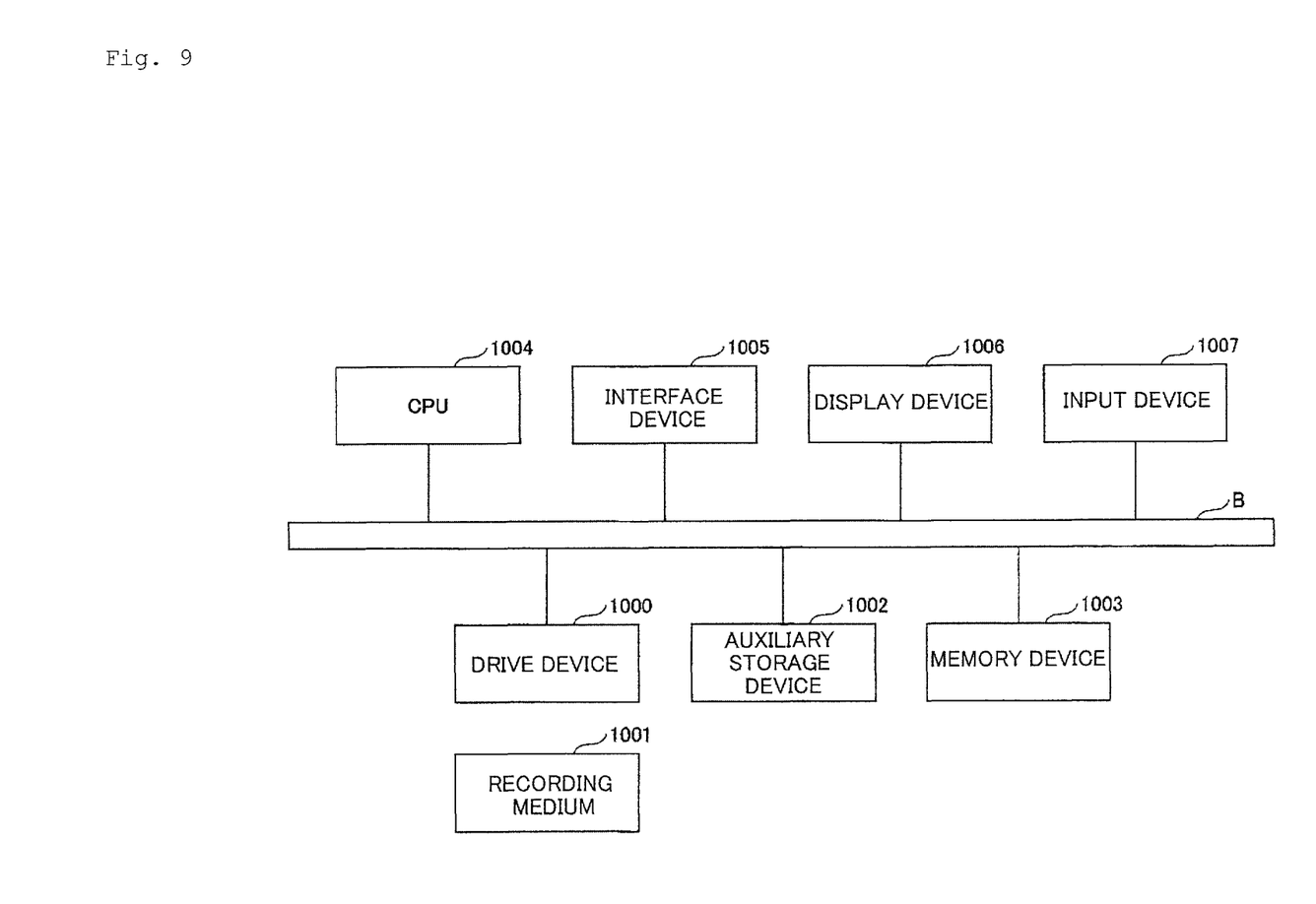
FIG. 9 is a diagram showing an example of a device hardware configuration.

FIG. 9 is a diagram showing a hardware configuration example of the computer. The computer of FIG. 9 includes a drive device 1000, an auxiliary storage device 1002, a memory device 1003, a CPU 1004, an interface device 1005, a display device 1006, an input device 1007, and the like, which are connected to each other by a bus B.

The program that realizes the processing in the computer is provided using, for example, a recording medium 1001 such as a CD-ROM or a memory card. When the recording medium 1001 storing the program is set in the drive device 1000, the program is installed from the recording medium 1001 to the auxiliary storage device 1002 via the drive device 1000. Note that the program does not necessarily need to be installed from the recording medium 1001, and may be downloaded from another computer via a network. The auxiliary storage device 1002 stores the installed program and also stores necessary files and data.

When a program startup instruction is given, the memory device 1003 reads and stores the program from the auxiliary storage device 1002. The CPU 1004 realizes functions pertaining to the device in accordance with the program stored in the memory device 1003. The interface device 1005 is used as an interface for connecting to a network, and functions as means for input/output via the network. The display device 1006 displays a programmatic GUI (Graphical User Interface) and the like. The input device 1007 is constituted by a keyboard, a mouse, buttons, a touch panel, or the like, and is used for inputting various operation instructions.

Working Example

<Processing Sequence>

Next, a working example in the case where an inspection packet is sent from the terminal 300T to the server A and the server B will be described based on the sequence diagram of FIG. 10. Note that when an inspection packet is sent from the server, processing is performed in the reverse order of this working example.

In step S101, the packet processing unit 312T of the terminal 300T transmits an inspection packet. In step S102, the end point notification unit 311T notifies the data collection unit 220 of the quality tabulation device 200 of the transmission time, transmission source information, packet size, and transmission flag.

In step S103, the in-network notification unit 110 of SLG #1 that received the inspection packet notifies the data collection unit 220 of the quality tabulation device 200 of the reception time, transmission source information, input source and output destination subslice IDs, and SLG ID.

In step S104, the slice processing unit 120 of SLG #1 references its own distribution table and acquires the subslice #1-1 and the subslice #1-2 as output destination subslices based on the source IP address and the like.

In steps S105 and S118, because two subslices were acquired, the slice processing unit 120 of the SLG #1 copies the inspection packet, writes the IDs of the output target subslices in the payload portions, and outputs the inspection packets to the two subslices. Note that although packet transfer is shown as being processed separately for each subslice in the sequence of FIG. 10 as shown by "A" in FIG. 10, this is for convenience in the illustration, and packet transfer processing is actually performed in parallel without any time difference.

In the SLG #2, processing similar to that described in steps S103 to S105 is performed for each subslice.

In the SLG #3 at the end point of the E2E slice, three inspection packets arrive via the subslices #2-1, #2-2, and #2-3 (S108, S113, S121). The slice processing unit 120 of the SLG #3 references the distribution table based on the input source subslice of each inspection packet and identifies the server 300S (the server at the end point of E2E) that belongs to the corresponding subslice (S110, S115, S123).

In this working example, the destinations of the inspection packets input from #2-1 and #2-2 are the server A, the destination of the inspection packet input from #2-3 is the server B, and the destination of each inspection packet is converted to the corresponding server address and output (S111, S116, S124).

Similarly to the SLG #1, the in-network notification unit 110 of the SLG #3 notifies the data collection unit 220 of the inspection packet reception time, transmission source information, input source and output destination subslice IDs, and SLG ID (S109, S114, S122).

After the inspection packet arrives, the server A and the server B notify the data collection unit 220 of the reception time, transmission source information, reception flag, and transit subslice ID described in the payload (S112, S117, S125).

In step S126, the quality calculation unit 210 of the quality tabulation device 200 calculates the E2E quality and the quality of each subslice based on the data accumulated in the data collection unit 220.

<Processing of Quality Calculation Unit 210>

Figure 11:
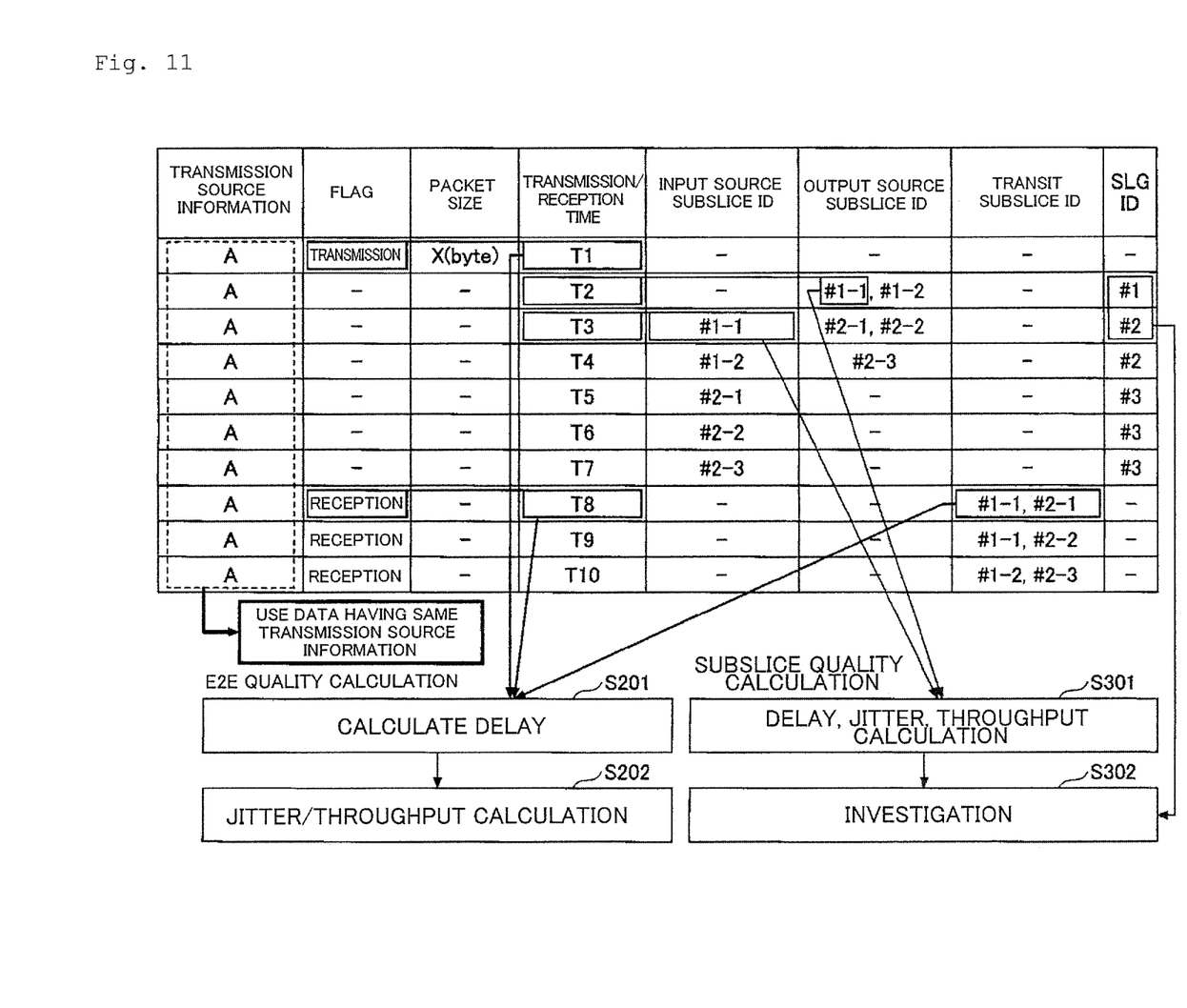
FIG. 11 is a diagram for describing data held in a data collection unit and the content of processing performed using such data.

An example of the quality information calculation processing performed in the quality calculation unit 210 will be described below in detail with reference to FIG. 11. The upper table of FIG. 11 shows an example of data held by the data collection unit 220. The lower portion of FIG. 11 shows the flow of E2E quality calculation and subslice quality calculation.

First, E2E quality calculation will be described. In step S201, the quality calculation unit 210 identifies the E2E slice based on the transit subslice ID, and calculates the delay from the time when the transmission/reception flag is present.

In the example of FIG. 11, T1 is the transmission time from the source of the packet whose source is A, and T8 is the reception time of the packet received via the E2E subslices (#1-1, #2-1), and therefore the delay time is calculated as T8−T1.

In step S202, the quality calculation unit 210 calculates the delay fluctuation (jitter) based on the delay time calculated a plurality of times. The quality calculation unit 210 also calculates the throughput from the delay and the packet size.

Next, the subslice quality calculation will be described. In step S301, based on output and input times for the same subslice, the quality calculation unit 210 calculates the delay for that subslice. Jitter and throughput can also be calculated similarly to the case of E2E. In step S302, if quality has deteriorated, the device with the target SLG ID is investigated.

In the example of FIG. 11, T3 is the reception time of the packet input from the subslice #1-1 to the SLG #2, and T2 is the reception time of the inspection packet output from the SLG #1 to the subslice #1-1, and therefore the delay time of the subslice #1-1 can be calculated as T3−T2.

Note that although both the E2E slice quality and the subslice quality are calculated here, either the E2E slice quality or the subslice quality may be calculated. Also, the quality of only a certain subslice may be calculated.

Figure 10:
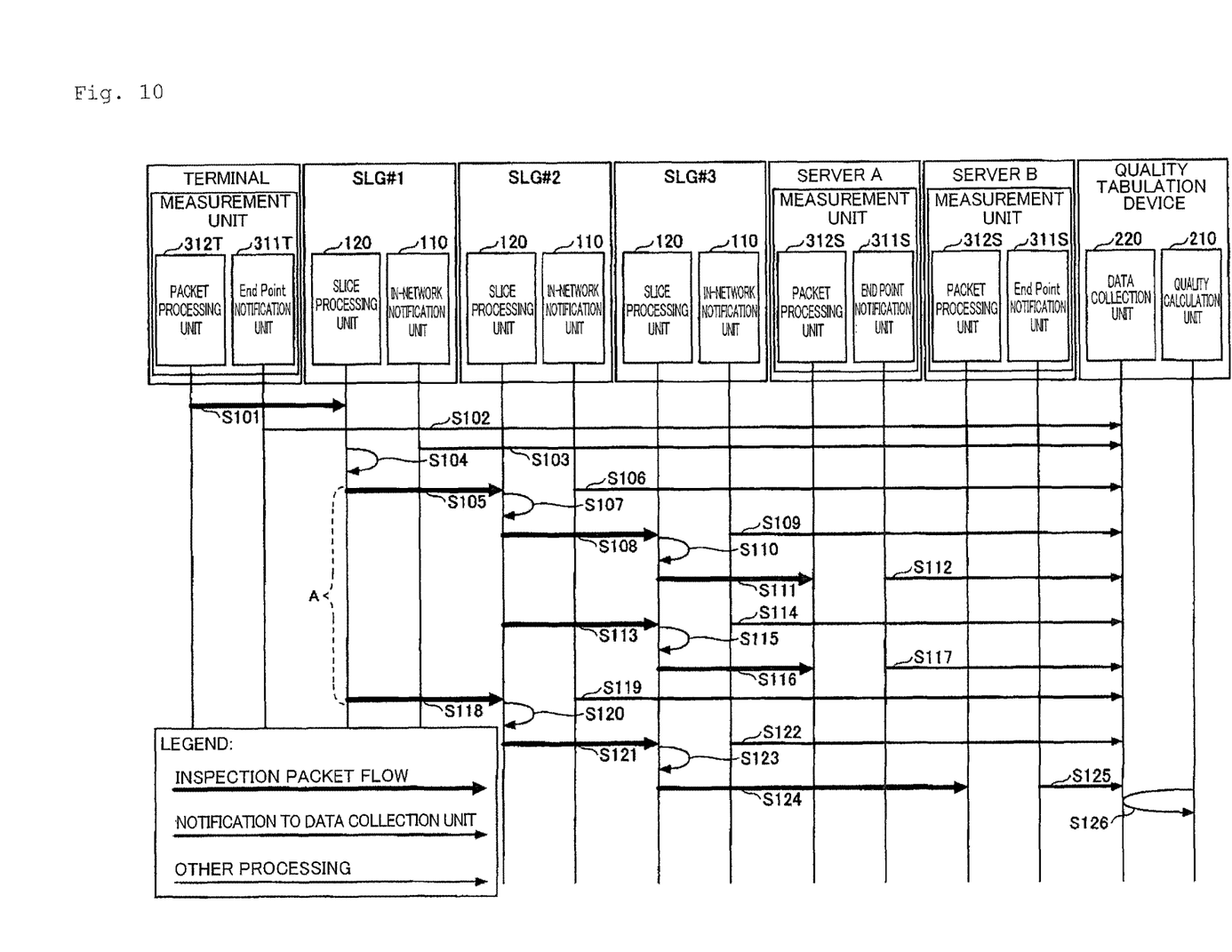
FIG. 10 is a diagram showing a processing sequence of the system.

Also, consider a case where a terminal other than the one shown in FIG. 10 transmits an inspection packet to the SLG #1 via the same E2E slice as the terminal shown in FIG. 10. If the aging timer of the E2E slice when the inspection packet from the other terminal arrives at the slice processing unit 120 (the time since the arrival of the packet in step S101) is within the preset time, the slice processing unit 120 discards the that delayed inspection packet.

Effects of Embodiment

According to the technique of the embodiment described above, E2E communication quality measurement can be performed without needing to implement a measurement function in the application at the communication end point Therefore, it is possible to expect an effect of reducing the number of implementation hurdles for applications that use E2E slices. Also, even in the case where different applications use the same E2E slice, quality measurement only needs to be performed one time for the same subslice, and it is possible to expect an effect of suppressing wasteful communication resource consumption. It is also possible to expect an effect of suppressing communication resource consumption caused by measuring the quality of the same E2E slice at excessively short time intervals.

Summary of Embodiments

The present specification discloses at least a slice gateway, a quality tabulation device, an inspection packet processing method, and a program in the following items.

(Item 1)

A slice gateway that connects one or more subslices in a network in which an E2E slice is made up of a plurality of subslices, the slice gateway including:
   a slice processing unit configured to receive an inspection packet, determine an output destination subslice of the inspection packet based on a distribution table, embed an ID of the output destination subslice in a payload of the inspection packet, and output the packet that includes the embedded ID to the output destination subslice; and
   a notification unit configured to notify a quality tabulation device of information regarding the inspection packet.

(Item 2)

The slice gateway according to item 1,
   wherein if a plurality of subslices are output destinations of the inspection packet, the slice processing unit copies the inspection packet and outputs the copied inspection packets to the plurality of subslices.

(Item 3)

The slice gateway according to item 1 or 2, wherein the information regarding the inspection packet that the notification unit transmits to the quality tabulation device includes a reception time of the inspection packet, transmission source information, an input source or an output destination subslice ID, and an ID of the slice gateway.

(Item 4)

The slice gateway according to item 1 or 2,
   wherein the slice processing unit calculates an aging timer, which is the time from when an inspection packet is transferred via an E2E slice until when an inspection packet arrives again via the same E2E slice, and if an inspection packet arrives again via the same E2E slice before the aging timer reaches a pre-set time, the inspection packet that arrived again is discarded.

(Item 5)

A quality tabulation device including:
   a data collection unit configured to collect information regarding the inspection packet from the slice gateway according to any one of items 1 to 3 and a device at an end point of communication performed via the E2E slice; and
   a quality calculation unit configured to calculate a quality of the E2E slice and a quality of the one or more subslices that make up the E2E slice, based on the information collected by the data collection unit.

(Item 6)

The quality tabulation device according to item 5,
   wherein in a case where the device transmitted the inspection packet, the information regarding the inspection packet collected from the device includes a transmission time, transmission source information, a packet size, and a transmission flag, and
   in a case where the device received the inspection packet, the information regarding the inspection packet collected from the device includes a reception time, a transmission source information, a reception flag, and a transit subslice ID.

(Item 7)

An inspection packet processing method for execution by a slice gateway that connects one or more subslices in a network in which an E2E slice is made up of a plurality of subslices, the inspection packet processing method including the steps of:
   receiving an inspection packet, determining an output destination subslice of the inspection packet based on a distribution table, embedding an ID of the output destination subslice in a payload of the inspection packet, and outputting the packet that includes the embedded ID to the output destination subslice; and
   notifying a quality tabulation device of information regarding the inspection packet.

(Item 8)

A program for causing a computer to function as the units of the slice gateway according to any one of items 1 to 4.

(Item 9)

A program for causing a computer to function as the units of the quality tabulation device according to item 5 or 6.

Although the present embodiment has been described above, the present invention is not limited to this specific embodiment, and various modifications and changes can be made within the scope of the gist of the present invention described in the claims.

REFERENCE SIGNS LIST

100 SLG
110 In-network notification unit
120 Slice processing unit
200 Quality tabulation device
210 Quality calculation unit
220 Data collection unit
300 Terminal or server
310 Measurement unit
311 End point notification unit
312 Packet processing unit
1000 Drive device
1001 Recording medium
1002 Auxiliary storage device
1003 Memory device
1004 CPU
1005 Interface device
1006 Display device
1007 Input device

The invention claimed is:

1. A slice gateway that connects one or more subslices in a network in which an E2E slice is made up of a plurality of subslices, the slice gateway comprising:
   a processor; and
   a memory that includes instructions, which when executed, cause the processor to execute:
   receiving an inspection packet, determining an output destination subslice of the inspection packet based on a distribution table, embedding an ID of the output destination subslice in a payload of the inspection packet, and outputting the packet that includes the embedded ID to the output destination subslice; and
   notifying a quality tabulation device of information regarding the inspection packet,
   wherein the processor is further caused to execute calculating an aging timer, which is the time from when an inspection packet is transferred via an E2E slice until when an inspection packet arrives again via the same E2E slice, and if an inspection packet arrives again via the same E2E slice before the aging timer reaches a pre-set time, only the inspection packet that arrived again via the same E2E slice is discarded,
   wherein the processor is further caused to:
   if a second inspection packet arrives again via a second E2E slice that is different from the E2E slice before the aging timer reaches the pre-set time, receive the second inspection packet, determine an output destination subslice of the second inspection packet based on the distribution table, embed an ID of the output destination subslice in a payload of the second inspection packet, and output the packet that includes the embedded ID to the output destination subslice; and notify the quality tabulation device of information regarding the second inspection packet.

2. The slice gateway according to claim 1, wherein if a plurality of subslices are output destinations of the inspection packet, the processor is further caused to execute copying the inspection packet and outputting the copied inspection packets to the plurality of subslices.

3. A system comprising:

a slice gateway that connects one or more subslices in a network in which an E2E slice is made up of a plurality of subslices, the slice gateway including:

a first processor; and a memory that includes instructions, which when executed, cause the processor to execute:

receiving an inspection packet, determining an output destination subslice of the inspection packet based on a distribution table, embedding an ID of the output destination subslice in a payload of the inspection packet, and outputting the packet that includes the embedded ID to the output destination subslice; and notifying a quality tabulation device of information regarding the inspection packet, wherein the first processor is further caused to execute calculating an aging timer, which is the time from when an inspection packet is transferred via an E2E slice until when an inspection packet arrives again via the same E2E slice, and if an inspection packet arrives again via the same E2E slice before the aging timer reaches a pre-set time, only the inspection packet that arrived again via the same E2E slice is discarded, wherein the first processor is further caused to:

if a second inspection packet arrives again via a second E2E slice that is different from the E2E slice before the aging timer reaches the pre-set time, receive the second inspection packet, determine an output destination subslice of the second inspection packet based on the distribution table, embed an ID of the output destination subslice in a payload of the second inspection packet, and output the packet that includes the embedded ID to the output destination subslice; and notify the quality tabulation device of information regarding the second inspection packet, and wherein the system further comprising:

a quality tabulation device comprising:

a second processor; and a memory that includes instructions, which when executed, cause the second processor to execute:

collecting information regarding the inspection packet from the slice gateway and a device at an end point of communication performed via the E2E slice; and calculating a quality of the E2E slice and a quality of the one or more subslices that make up the E2E slice, based on the collected information.

4. The system according to claim 3, wherein in a case where the device transmitted the inspection packet, the information regarding the inspection packet collected from the device includes a transmission time, transmission source information, a packet size, and a transmission flag, and in a case where the device received the inspection packet, the information regarding the inspection packet collected from the device includes a reception time, a transmission source information, a reception flag, and a transit subslice ID.

5. An inspection packet processing method for execution by a slice gateway that connects one or more subslices in a network in which an E2E slice is made up of a plurality of subslices, the inspection packet processing method comprising:

receiving an inspection packet, determining an output destination subslice of the inspection packet based on a distribution table, embedding an ID of the output destination subslice in a payload of the inspection packet, and outputting the packet that includes the embedded ID to the output destination subslice; and notifying a quality tabulation device of information regarding the inspection packet, wherein the inspection packet processing method further comprises:

executing calculating an aging timer, which is the time from when an inspection packet is transferred via an E2E slice until when an inspection packet arrives again via the same E2E slice, and if an inspection packet arrives again via the same E2E slice before the aging timer reaches a pre-set time, discarding only the inspection packet that arrived again via the same E2E slice, and wherein the inspection packet processing method further comprises:

if a second inspection packet arrives again via a second E2E slice that is different from the E2E slice before the aging timer reaches the pre-set time, receiving the second inspection packet, determine an output destination subslice of the second inspection packet based on the distribution table, embedding an ID of the output destination subslice in a payload of the second inspection packet, and outputting the packet that includes the embedded ID to the output destination subslice; and notifying the quality tabulation device of information regarding the second inspection packet.

6. A non-transitory computer readable medium storing a program for causing a computer to function as the slice gateway according to claim 1.

7. A non-transitory computer readable medium storing a program for causing a computer to function as the system according to claim 3.

* * * * *